United States Patent
Kamijo et al.

(10) Patent No.: US 7,936,423 B2
(45) Date of Patent: May 3, 2011

(54) DISPLAY DEVICE

(75) Inventors: Kimitaka Kamijo, Tottori (JP); Keiji Takizawa, Azumino (JP); Toshinori Uehara, Tottori (JP); Tomoyuki Nakano, Tottori (JP)

(73) Assignee: Sony Corporation, Tokyo (JP)

( * ) Notice: Subject to any disclaimer, the term of this patent is extended or adjusted under 35 U.S.C. 154(b) by 769 days.

(21) Appl. No.: 12/008,676

(22) Filed: Jan. 11, 2008

(65) Prior Publication Data
US 2008/0284954 A1 Nov. 20, 2008

(30) Foreign Application Priority Data

Jan. 12, 2007 (JP) ................. 2007-004313
Sep. 26, 2007 (JP) ................. 2007-248570

(51) Int. Cl.
*G02F 1/1335* (2006.01)
(52) U.S. Cl. ........................................ 349/109
(58) Field of Classification Search .......... None
See application file for complete search history.

(56) References Cited

U.S. PATENT DOCUMENTS

| 5,519,565 | A | * | 5/1996 | Kalt et al. ................ 361/280 |
| 7,006,294 | B2 | * | 2/2006 | Steenblik et al. ......... 359/619 |
| 7,199,911 | B2 | * | 4/2007 | Hudson et al. ............. 359/2 |
| 7,626,749 | B2 | * | 12/2009 | Baur et al. ................ 359/265 |
| 7,750,821 | B1 | * | 7/2010 | Taborisskiy et al. .... 340/815.45 |
| 7,821,388 | B1 | * | 10/2010 | Booth et al. .............. 340/471 |
| 2004/0032659 | A1 | * | 2/2004 | Drinkwater ............. 359/558 |
| 2005/0270604 | A1 | * | 12/2005 | Drinkwater .............. 359/2 |

FOREIGN PATENT DOCUMENTS

| JP | 11-101992 | 4/1999 |
| JP | 2004-061796 | 2/2004 |
| JP | 2006-301343 | 11/2006 |

* cited by examiner

*Primary Examiner* — Timothy Rude
(74) *Attorney, Agent, or Firm* — K&L Gates LLP

(57) ABSTRACT

A liquid crystal display device 1 has subpixels 10 having a light-transmissive region 10a and a light-reflective region 10b. A color filter layer 50 corresponding to an identification pattern 70 that it is desired to be displayed when the liquid crystal display device 1's power is off is formed at the light-reflective regions 10b, so that even when the liquid crystal display device 1 is in the non-driven state, incident external light emerges as outgoing light having the colors of the color layers corresponding to the identification pattern, and hence the identification pattern can be displayed. Thus, any desired pattern can be displayed in the liquid crystal display device's non-driven state, so that a liquid crystal display device with extensive expression and superior display characteristics is provided.

3 Claims, 5 Drawing Sheets

DISPLAY DEVICE

BACKGROUND

1. Technical Field

The present invention relates to a display device.

2. Related Art

Liquid crystal display devices such as set forth in JP-A-11-101992 are widely used in the display units of mobile telephones and the like electronic equipment. When used as the display unit of a mobile telephone, for instance, they will display a wide variety images, including manufacturer logos and particular patterns, etc., on the standby and other screens.

In recent years, higher levels of design have been required of electronic equipment. Regarding mobile telephones, for example, proposals have been made to raise the design level of the equipment as a whole, including the display unit, by enabling not only display of images on the standby screen, but also display of such images when the power is turned off. In that case, a display unit possessing extensive power of expression would be needed in order to display images also when the power is off.

However, in liquid crystal display devices of the related art such as set forth in JP-A-11-101992, nothing is displayed when the power is turned off. To display images on the liquid crystal display device's display unit, it is necessary to drive the device with the power on. Therefore, extensive expression such as any image could be displayed while the power is off cannot be realized.

SUMMARY

An advantage of some aspects of the present invention is to provide a liquid crystal display device with superior display characteristics that possesses extensive power of expression able to display patterns including manufacturer logos and other identificatory symbols and the like even when the power is off.

According to an aspect of the invention, a display device includes a plurality of subpixels having light-reflective regions and light-transmissive regions, and a display area constituted of the subpixels arranged in a matrix, and has the innovative feature that color layer corresponding to a pattern that is desired to be displayed in the display area when the display device is in a non-driven state is formed in the light-reflective regions of the subpixels corresponding to the pattern.

Thanks to such structure, even with the display device in the non-driven state, when incident light composed of external light emerges, it will emerge as outgoing light possessing the color of the color layer corresponding to the identificatory or other pattern. Hence it will be possible to display the pattern, and the display device will have superior display characteristics, possessing extensive power of expression.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will now be described with reference to the accompanying drawings. The scales of the drawings are varied as appropriate to show the various members in discernible sizes.

First Embodiment

Figure 1:
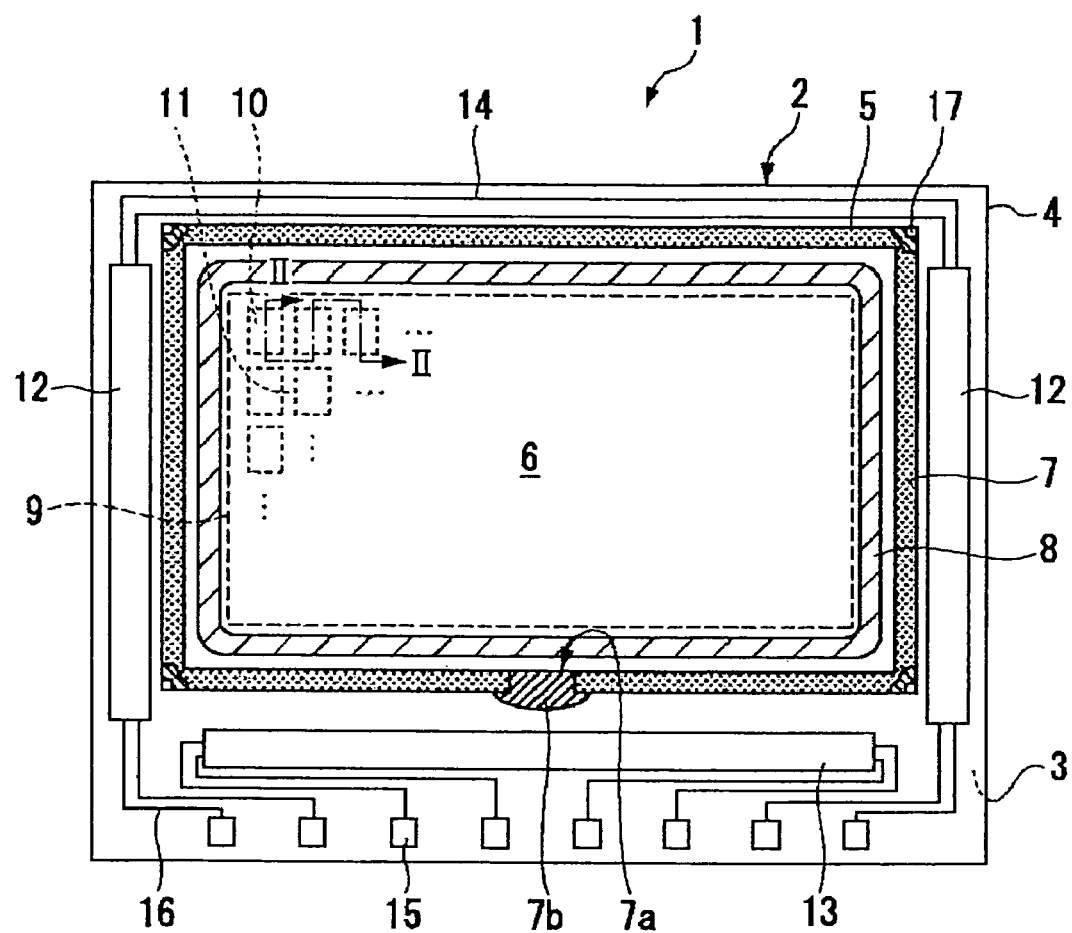
FIG. 1 is a plan view illustrating a structure of a liquid crystal display device in an embodiment of the present invention.

FIG. 1 is a view illustrating an overall structure of a liquid crystal display device 1 of a first embodiment of the present invention. As an example for the purpose of description, this is an active matrix type semitransmissive reflecting type liquid crystal display device using thin film transistors ("TFTs" below) as switching elements.

As FIG. 1 shows, the liquid crystal display device 1 is structured with a liquid crystal panel 2 and a backlight 3 as main elements. The liquid crystal panel 2 and backlight 3 are disposed so as to be superposed when viewed from above, and in FIG. 1 only the liquid crystal panel 2 is visible.

The liquid crystal panel 2 is what is called a "semitransmissive" liquid crystal panel. It has a structure such that a TFT array substrate (first substrate) 4 and a color filter substrate (second substrate) 5 are bonded together by means of seal material 7, and an area defined by the seal material 7 is filled with a liquid crystal layer 6. In a portion of the seal material 7 there is provided a filling hole 7a for pouring a liquid crystal. The filling hole 7a is sealed by sealant 7b. In an area at the insides of the seal material 7 there is provided an opaque layer (peripheral shading) 8 constituted of a light-blocking material. An area inside the peripheral shading 8 is a display area 9 that displays images, moving pictures and the like. In the display area 9, multiple subpixels 10 are provided in a matrix arrangement. The spaces between the subpixels 10 are the interpixel spaces 11. Although in FIG. 1 the display area 9, which is formed with the subpixels 10 laid out in a matrix arrangement, is shown as being rectangular, it is not limited to being rectangular. For example, the subpixels 10 could equally well be laid out so that the display area 9 is circular or elliptical. It will also be appreciated that, naturally, what is termed a delta layout is included in what is here referred to as a matrix arrangement for the layout of the subpixels 10.

The periphery of the TFT array substrate 4 is an overhang region that protrudes out beyond the color filter substrate 5. At the left and right edges, as viewed in the figure, of this protruding region there are formed scan line drive circuits 12 that generate scan signals. Along the top edge, as viewed in the figure, is passed a wire 14 that connects the left and right scan line drive circuits 12. At the bottom edge, as viewed in the figure, there are formed a data line drive circuit 13 that generate data signals, and connection terminals 15 for connection to external circuits and the like. Between the scan line drive circuits 12 and the connection terminals 15 for connection to external circuits and the like, there are formed wires 16 for connecting the two. At each corner of the color filter substrate 5 there is provided an inter-substrate conductive material 17 for electrically connecting the TFT array substrate 4 and the color filter substrate 5.

Figure 2:
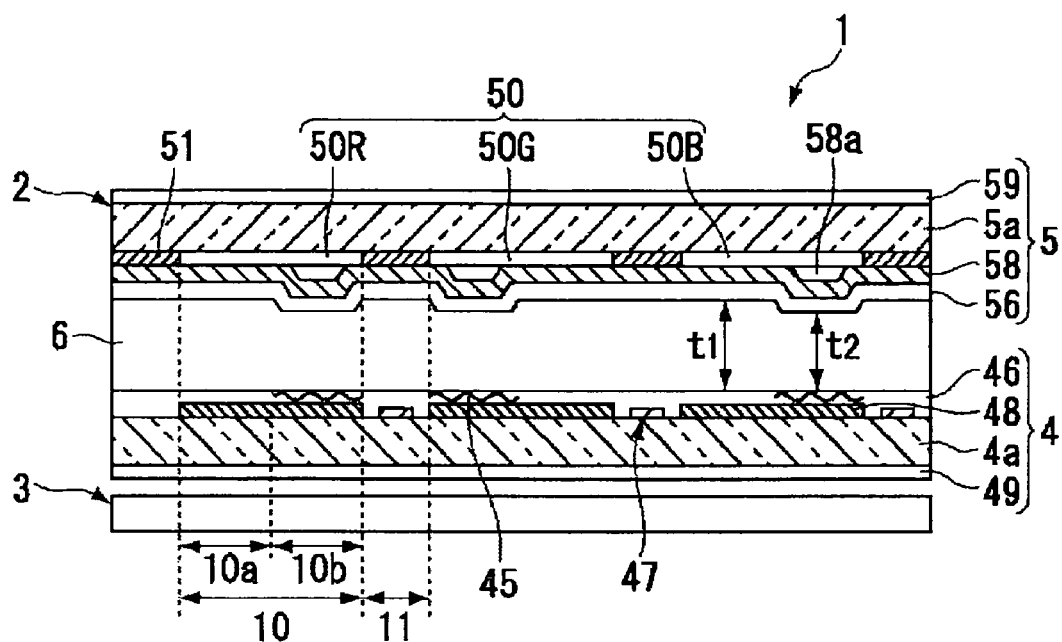
FIG. 2 is a cross-sectional view illustrating a structure of a liquid crystal display device in an embodiment of the present invention.

FIG. 2 is a view illustrating the structure along cross-section II-II in FIG. 1.

The TFT array substrate 4 is composed of, as main elements: a substratum 4a formed from a material of high translucency, say glass; quartz or the like; pixel electrodes 48 that are formed on the liquid crystal side of the substratum 4a; switching elements 47 that supply electrical signals to the pixel electrodes 48; light-reflective layers 45; an alignment film 46 that covers the pixel electrodes 48, switching elements 47 and light-reflective layers 45; and a polarization plate 49 that is bonded onto the outside (opposite side to the liquid crystal layer 6 side) of the substratum 4a.

The pixel electrodes 48 are disposed in regions overlying the subpixels 10, viewed from above, and are formed from a transparent conductive material, say indium tin oxide (ITO) or the like. The switching elements 47 are disposed inside the interpixel spaces 11, and are provided so as to correspond one for one with the pixel electrodes 48. Thus, the alignment of the liquid crystal layer 6 can be regulated independently at each subpixel 10. The switching elements 47 are constituted of, say, TFT, and are connected to scan lines or data lines not shown in the figure. The alignment film 46 is provided at the interface with the liquid crystal layer 6, and regulates the alignment of the liquid crystal molecules composing the liquid crystal layer 6. Although the switching elements 47 are here disposed inside the interpixel spaces 11, they are not limited to being disposed in this position, and could alternatively be disposed at the subpixels 10. More specifically, they could be disposed below the light-reflective layers 45 formed in light-reflective regions 10b to be described hereafter, or the pixel electrodes 48. If so, it will be possible to make the interpixel areas 11 smaller, since the switching elements 47 will then not impede the external light utilized for displays, or the light from the backlight 3.

The light-reflective layers 45 are metallic layers constituted of, say, aluminum or the like, and reflect light toward the color filter substrate 5. The light-reflective layers 45 are formed on the liquid crystal layer 6 side of the pixel electrodes 48, and are provided so as to take up any desired proportion of the interior spaces of the subpixels 10 viewed from above. In FIG. 2 they are provided in regions occupying almost half of the interior of the subpixels 10 viewed from above. Such regions are the light-reflective regions 10b. The regions where light-reflective layers 45 are not provided are light-transmissive regions 10a, through which light from the backlight 3 is transmitted to the liquid crystal layer 6 and color filter substrate 5. The outer faces (liquid crystal layer 6 side faces) of the light-reflective layers 45 are the reflective faces. A concavoconvex pattern is formed in such reflective faces. The light-reflective layers 45 are all of a particular thickness. Although in FIG. 2 the light-reflective layers 45 are formed above the pixel electrodes 48, they could alternatively be formed below the pixel electrodes 48 if the pixel electrodes 48 possess transparency. Also, if there is electrical continuity between the pixel electrodes 48 of the light-transmissive regions 10a and the light reflecting layers 45, then at the light-reflective regions 10b, the light reflecting layers 45 could double as the pixel electrodes 48.

The color filter substrate 5 is composed of a substratum 5a, a color filter layer 50, an opaque layer 51, a common electrode 58, and an alignment film 56, as main elements.

The substratum 5a, like the substratum 4a, is a rectangular plate-shaped member formed from a material of high translucency, say glass, quartz or the like. The color filter layer 50 is provided on the liquid crystal layer 6 side of the substratum 5a so as to overlie the subpixels 10 viewed from above. The color filter layer 50 is made up of layers of three colors, say a red layer 50R, a green layer 50G, and a blue layer 50B.

Over each of the subpixels 10, a one of the color filter layer 50's three color layers is provided, the red layer 50R, green layer 50G, and blue layer 50B each being laid out in rows that are adjacent. Three subpixels 10 that are adjacent to each other and possess the differing color layers of the color filter layer 50 form a set which constitutes one pixel. Further details relating to the color filter layer 50 will be given hereafter.

The opaque layer 51 is a light-blocking members constituted of material able to reflect or absorb light, and is provided around the periphery of the color filter layer 50.

The common electrode 58 is formed from a transparent conductive material, say ITO or the like, and is provided so as to cover the color filter layer 50 and opaque layer 51. At those regions of the common electrode 58 that, viewed from above, overlie the light reflecting layers 45, there are formed transparent layers 58a that is an insulator on the under layer, and so those regions are formed so as to be closer to the TFT array substrate 4 side than the other regions. As a result, the liquid crystal layer 6 gap t2 at the regions where the light reflecting layers 45 are provided is smaller than the liquid crystal layer 6 gap t1 at the other regions. The alignment film 56 is provided at the interface with the liquid crystal layer 6 and regulates the alignment of the liquid crystal molecules composing the liquid crystal layer 6 between itself and the alignment film 46.

The liquid crystal layer 6 is composed of liquid crystal molecules of fluorinated or non-fluorinated liquid crystal compound or the like, and is sandwiched between the two substrates so as to be in contact with both the TFT array substrate 4 side alignment film 46 and the color filter substrate 5 side alignment film 56. The alignment of the liquid crystal molecules is regulated by the alignment film 46 and alignment film 56 so as not to transmit light when in the non-driven state where no voltage is applied ("normally white mode").

Figure 3:
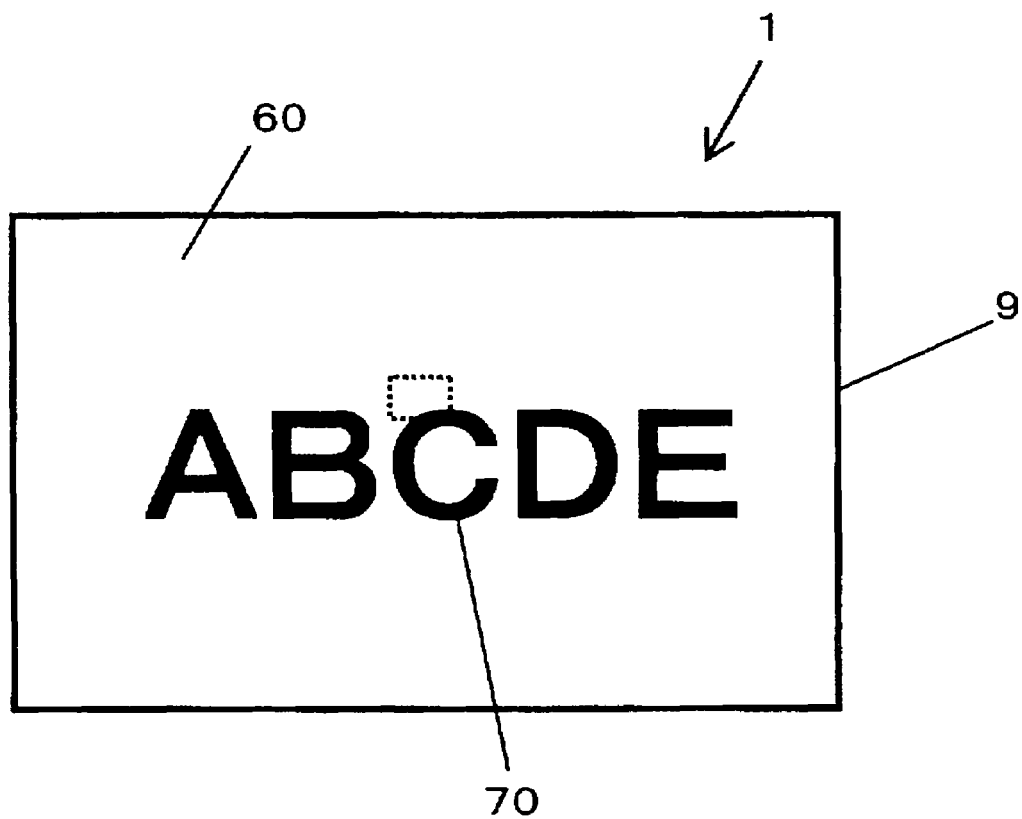
FIG. 3 is a plan view illustrating a structure of a portion of a liquid crystal display device in an embodiment of the present invention.

Next will be described the state of the display area 9 when the power is off in the liquid crystal display device 1 structured in the foregoing manner. FIG. 3 represents the display area 9 in the state where the liquid crystal display device's power is turned off, that is, the state where voltage is not applied to the liquid crystal layer 6 between the TFT array substrate 4 and the color filter substrate 5.

Any desired identification pattern, contrasting with the background pattern, may be displayed for users of the liquid crystal display device 1 to view when they observe the display area 9. In the present embodiment, symbols constituted of ABCDE are displayed as the identification pattern 70, as shown in FIG. 3.

Although letters of the alphabet are shown as the identification pattern 70 in the present embodiment, it is not limited to letters of the alphabet such as shown here. According to the invention, other patterns besides letters can be displayed for the user to view when the liquid crystal display device's power is off. Specific examples of such alternative patterns are a floral pattern and a checkerboard pattern.

Thus, whereas in a liquid crystal display device, normally, nothing at all is displayed other than a background pattern 60 when the power is off, it is possible that the liquid crystal display device 1 of the invention displays any identification pattern 70 desired without applying voltage to the liquid crystal display layer 6. This aspect will now be described in detail.

Figure 4A:
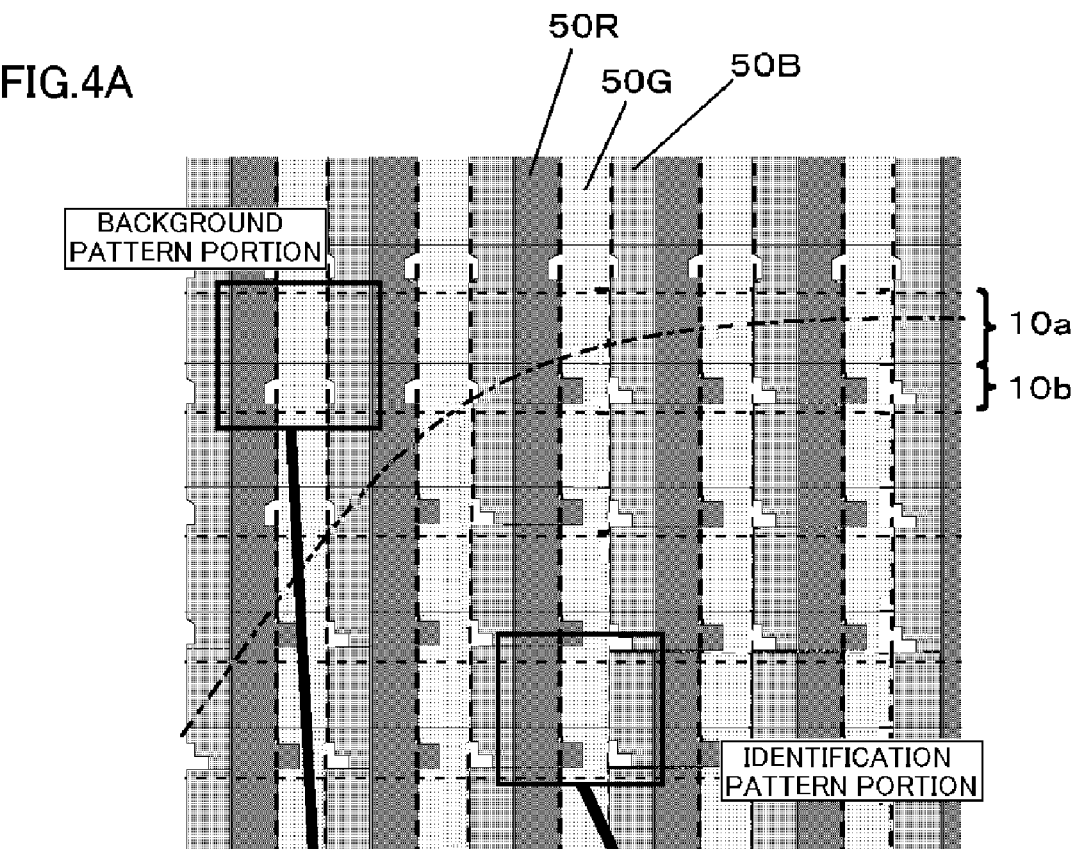
FIG. 4 is a pair of plan views illustrating a structure of portions of a liquid crystal display device in an embodiment of the present invention.

FIG. 4A is a plan view of the color filter substrate 5 in the region which is indicated by the dotted lines in FIG. 3 and includes a part of the letter C of the identification pattern 70. The case described here is that where the identification pattern 70 is in the color red. Also, although the boundary between the background pattern portion constituting part of the background pattern 60 and the identification pattern portion constituting part of the identification pattern 70 is indicated with a dash-dot line in FIG. 4A, this line does not represent a strict boundary.

In the color filter layer 50 in the background pattern portion constituting part of the background pattern 60, either the red layer 50R, or the green layer 50G, or the blue layer 50B, is formed at each subpixel 10. Also, the color layers—the red layers 50R, the green layers 50G, and the blue layers 50B—are formed as contiguous stripe-like lines.

The color filter layer 50 is formed so as to correspond to the entire surface of the light-transmissive region 10a of each subpixel 10. By contrast, at the light-reflective regions 10b of the subpixels 10, the color filter layer 50 is formed with a partial cut-away. Such provision of partial cut-aways in the color filter layer 50 at the light-reflective regions 10b is in order to produce the same appearance of the displays at the light-transmissive regions 10a and of the displays at the light-reflective regions 10b when the power is off. This is a structural feature long known in the related art.

The reason why the cut-aways at the green layers 50G are larger than at the red layers 50R and blue layers 50B is that the sensitivity of the color green is higher than that of red and blue. This too is a structural feature long known in the related art.

Figure 4B:
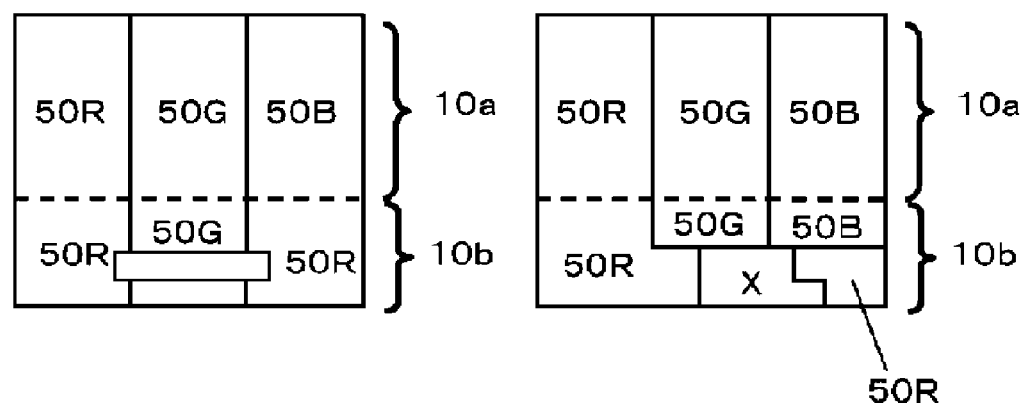

Next will be described the color filter layer 50 at the identification pattern portion constituting part of the identification pattern 70. FIG. 4B gives plan views of single pixels each constituted by three subpixels 10 in the identification pattern portion in the color filter substrate 5 shown in FIG. 4A.

The color filter layer 50 at the identification pattern portion is basically the same as the color filter layer 50 at the background pattern portion, with either the red layer 50R, or the green layer 50G, or the blue layer 50B, being formed at each subpixel 10 and in contiguous stripe-like lines. Also, the color filter layer 50 is formed so as to correspond to the entire surface of the light-transmissive region 10a of each subpixel 10.

In order to display the identification pattern 70 in the color red when the power of the liquid crystal display device 1 is off, in the light-reflective regions 10b of each subpixel 10, the red layers 50R are formed not only at the subpixels 10 that are constituted with the red layer 50R, but also at part of the subpixels 10 that are constituted with the green layer 50G or blue layer 50B. That is, the red layers 50R are formed at parts of the light-reflective regions 10b of the subpixels 10 that are constituted with the green layer 50G or blue layer 50B.

More specifically, as FIG. 4B shows, at the subpixels 10 corresponding to the red layers 50R, the red layers 50R are formed over the entire surface of the light-reflective region 10b, while at the subpixels 10 corresponding to the green layers 50G, the red layer 50R, in addition to the original green layer 50G, is also formed over part of the light-reflective region 10b. Similarly, at the subpixels 10 corresponding to the blue layers 50B, the red layer 50R, in addition to the original blue layer 50B, is also formed over part of the light-reflective region 10b. The place marked with "X" in the figure is a portion where no color layer is formed.

Thus, corresponding to the identification pattern 70 that it is desired to be displayed when the power of the liquid crystal display 1 is off, by forming the color filter layer 50, comprising color layers other than the original colors at the light-reflective regions 10b, it will be possible to display, when the power of the liquid crystal display 1 is off, the identification pattern 70 contrasting with the background pattern 60 where the normal color filter layer 50 is formed.

Thus, normally, when in the non-driven state, observers will view only light resulting from external light that has been reflected by the light reflecting layers 45 at the light-reflective regions 10, and no light will be transmitted through the light-transmissive regions 10a from the backlight 3. But if, at the light-reflective regions 10b of the subpixels 10 corresponding to the identification pattern 70, the color filter layer 50 is formed with colors other than those corresponding to such subpixels 10, then observers will view reflected light with such colors other than the corresponding colors emphasized, and consequently the identification pattern 70 will be viewed as being raised up on the background pattern 60.

Thus, in a liquid crystal display device having subpixels with a light-transmissive region and a light-reflective region, by forming at the light reflective regions 10b the color layers that correspond to the identification pattern that it is desired to display when the power of the liquid crystal display device is off, it will be possible to have such identification pattern displayed even though the liquid crystal display device is in the non-driven state, because when the incident external light emerges, it will be outgoing light that possesses the colors of the color layers corresponding to the identification pattern.

Also, when the liquid crystal display device's power is turned on, the usual moving, static and various other images and the like can be displayed by means of light that comes from the backlight 3 and emerges via the light-transmissive regions 10a. At such time, the external light that emerges via the light-reflective regions 10b will be extremely weak compared with the light that emerges via the light-transmissive regions 10a, and therefore the identification symbols will be hardly observable by users.

Second Embodiment

Figure 5:
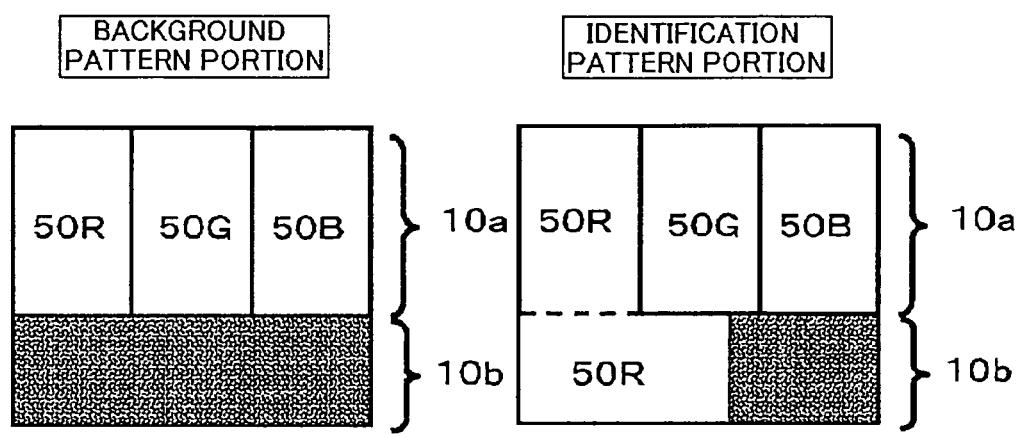
FIG. 5 is a pair of plan views illustrating a structure of portions of a liquid crystal display device in a second embodiment of the present invention.

A second embodiment of the invention will now be described. FIG. 5 gives plan views of a background pattern portion's subpixels and of an identification pattern portion's subpixels in a second embodiment.

Whereas in the liquid crystal display device of the first embodiment, the color filter layer 50 is provided at the portions corresponding to the light-reflective regions 10b, in the liquid crystal display device of the second embodiment, no color filter layer 50 is provided at the light-reflective regions 10b in the portions constituting the background pattern 60, and color layers corresponding to the identification pattern 70—red layers 50R in the present case—are formed only at those portions of the light-reflective regions 10b that correspond to the identification pattern 70. Hence, the background pattern 60 will be displayed as white or an intermediate tone between white and black. Also, by leaving the backlight 3 off when the liquid crystal display device's power is turned on, a monochrome display using only the light-reflective regions 10b will be enabled.

Alternatively, the blue layers 50B alone could be disposed at the light-reflective regions 10b in the background pattern 60, and the red layers 50R alone at the light-reflective regions 10b in the identification pattern 70. With such arrangement, the display will be such that patterns are displayed over the whole of the display area 9. Although the background pattern 60 and identification pattern 70 are used here in the description of the present embodiment, the desired patterns to be displayed in the display area are displayed by using the identification pattern 70. The patterns displayed in the display area when the display device of the present embodiment is in the non-driven state could equally well be geometrical patterns, gradation patterns or the like. That is, the display could be one where the background pattern and identification pattern cannot be distinguished.

In the liquid crystal display devices of the first and second embodiments, the identification pattern 70 is described as being red in color, but it is not limited to red, and could alternatively be green or blue. For a green-colored identification pattern, it will suffice to form additionally a green layer at the red layer portion and the blue layer portion of the light-reflective regions 10b in the subpixels corresponding to the identification pattern.

Furthermore, the invention is not limited to a red, green or blue identification pattern. An identification pattern of another color (say, purple or yellow) could be realized by forming color layers corresponding to that color at the light-reflective regions 10b, or by appropriately altering the proportions of the light-reflective regions 10b that are taken up by the red and/or green or blue layers, so as to synthesize the color. It will be more effective, in terms of the number of manufacturing processes and related considerations, to synthesize the color by appropriately altering the proportions taken up by the color layers normally used for the subpixels, rather than to specially prepare color layers corresponding to the color for the identification pattern, in addition to the red, green and blue layers.

The identification pattern could also be made up of multiple colors. For instance, the letters ABCDE that featured in the description of the embodiments could each be of a different color. In such a case, each color could be realized using any of the foregoing methods.

Also, although in the foregoing embodiments the alignment of the liquid crystal layer was regulated so that what is termed the normally white mode applied to all the regions thereof, the invention is not limited to this. Alternatively for instance, the liquid crystal layer's alignment could be regulated partially, so that the normally white mode applied only to the regions with subpixels that correspond to the identification symbols.

Also, although in the first and second embodiments, pixel electrodes 48 are formed at the light-reflective regions of the subpixels that display the patterns in the non-driven state, so that the alignment of the liquid crystal molecules in the liquid crystal layer 6 is altered even when the liquid crystal display device is in the driven state, it will alternatively be possible, by for example not providing pixel electrodes 48 at such portions, not to alter the alignment of the liquid crystal molecules in the driven state of the liquid crystal display device. In that case, turned onto drive the liquid crystal display device, the liquid crystal molecules at the light-reflective regions will not be driven, and consequently, when display image signals are applied, the light-reflective regions will not contribute to the displays produced by the display image signals.

Also, although the descriptions of the first and second embodiments concerned a liquid crystal display device, the invention is not limited to liquid crystal display devices, and could equally well be applied to other display devices, such as what are termed organic EL display devices or what are known as electronic paper display devices.

What is claimed is:

1. A display device comprising:
    a plurality of subpixels having light-reflective regions and light-transmissive regions; and
    a display area constituted of the subpixels arranged in a matrix;
    a color layer being formed corresponding to a pattern that is desired to be displayed in the display area when the display device is in a non-driven state in the light-reflective regions of the subpixels corresponding to the pattern.

2. The display device according to claim 1, further comprising:
    a first substrate and a second substrate that are disposed opposing each other; and
    a liquid crystal layer that is sandwiched between the first substrate and the second substrate;
    wherein, at least the light-reflective regions of the subpixels corresponding to the pattern that is desired to be displayed in the display area are in a normally white mode that is displayed as white in the non-driven state.

3. The display device according to claim 1, wherein the color layer corresponding to the pattern is a hue composed of a red layer, a green layer, and a blue layer.

* * * * *